(12) United States Patent
Trepanier et al.

(10) Patent No.: US 6,437,886 B1
(45) Date of Patent: Aug. 20, 2002

(54) DEVICE AND METHOD FOR RECORDING AN INTERFERENCE PATTERN IN A PHOTOSENSITIVE MEDIUM

(75) Inventors: Francois Trepanier, Saint-Augustin-de-Desmaures; Pierre Langlois, Sainte-Catherine de la Jacques-Cartier, both of (CA)

(73) Assignee: Institut National d'Optique, Quebec (CA)

( * ) Notice: Subject to any disclaimer, the term of this patent is extended or adjusted under 35 U.S.C. 154(b) by 0 days.

(21) Appl. No.: 09/549,383

(22) Filed: Apr. 13, 2000

(30) Foreign Application Priority Data

May 11, 1999 (CA) .............................. 2272008

(51) Int. Cl.$^7$ ................................ G03H 1/04
(52) U.S. Cl. ............... 359/35; 359/34; 359/1; 385/37
(58) Field of Search ................ 359/35, 34; 385/37

(56) References Cited

U.S. PATENT DOCUMENTS

| | | | | |
|---|---|---|---|---|
| 3,494,698 A | * | 2/1970 | Neumann | 359/1 |
| 4,924,257 A | | 5/1990 | Jain | 355/53 |
| 4,995,685 A | * | 2/1991 | Armstrong | 359/3 |
| 5,066,133 A | | 11/1991 | Brienza | 359/570 |
| 5,291,240 A | | 3/1994 | Jain | 355/53 |
| 5,363,239 A | | 11/1994 | Mizrahi et al. | 359/570 |
| 5,367,588 A | | 11/1994 | Hill et al. | 385/37 |
| 5,388,173 A | * | 2/1995 | Glenn | 359/10 |
| 5,473,410 A | | 12/1995 | Nishi | 355/53 |
| 5,663,784 A | | 9/1997 | Tanimoto | 355/68 |
| 5,760,960 A | * | 6/1998 | Lin | 359/34 |
| 6,002,499 A | * | 12/1999 | Corboline | 359/35 |
| 6,310,996 B1 | * | 10/2001 | Byron | 385/37 |

FOREIGN PATENT DOCUMENTS

EP 0682272 11/1988 ............ G02B/5/18

OTHER PUBLICATIONS

Piecewise interferometric generation of precision gratings; L.F. Mollenauer and W.J. Tomlinson; Mar. 1977; vol. 16, No. 3 Applied Optices.
Novel writing technique of long and highly reflective in-fibre gratings; J. Martin and F. Ouellette; Electronics Letter Online No. 19940556; Feb. 22, 1994.
Novel method for making parabolic grating; 142/SPIE vol. 2687 pp. 142–149.
Adaptive optical system for writing large holographic optical elements; M.V. Tyutchev. et al. J. Opt. Technol. 61 (11) Nov. 1994 pp. 839–844.
Analysis of an active stabilization system for a holographic optical setup; Jaime Frejlich et al. Applied Optics, vol. 27, No. 20, May 15, 1988, pp. 1967–1976.

* cited by examiner

Primary Examiner—Cassandra Spyrou
Assistant Examiner—Leo Boutsikaris
(74) Attorney, Agent, or Firm—Merchant & Gould P.C.

(57) ABSTRACT

A device and method for recording holographic gratings by the use of a single illuminating beam, two diffraction gratings, light detectors and a slit-scanning system. The beam illuminates two slits that then define two beams that are incident on the gratings. One diffracted order from one beam and one diffracted order from the other beam then interfere on a recording plane to produce sinusoidal variations of intensity. The interfering region may instantaneously be limited by a third slit. Also, another order of diffraction from one beam may be directed toward its own light detector and so is another order of diffraction from the other beam. These two detectors allow real time monitoring of the light intensity of each beam. By moving the slits in a direction parallel to the recording plane, an area larger than the slits' width can be exposed by the interfering pattern.

44 Claims, 8 Drawing Sheets

LARGE SLIT

NARROW SLIT

DEVICE AND METHOD FOR RECORDING AN INTERFERENCE PATTERN IN A PHOTOSENSITIVE MEDIUM

FIELD OF THE INVENTION

The present invention relates to a device and a method for recording an interference pattern, such as holographic gratings or the like, in a photosensitive medium.

BACKGROUND

Optical elements of all kinds are often manufactured by impinging a light beam on a photosensitive medium to modify its optical, chemical or mechanical properties. A widely popular application of such a technique is to make diffraction gratings for use in spectroscopic, metrological and optical communication instruments, as well as for laser systems and a multitude of other systems having a use for such diffraction gratings.

Manufacture of gratings by interferometric methods has been well known for many years. The most common of such methods is by using two expanded collimated laser beams incident on a photosensitive plate. After exposure, the photosensitive plate is processed to obtain volume or relief structure grating, depending on the photosensitive material used. Assuming perfect collimation, the resulting gratings have uniform pitch. The recorded pitch has a value of $$\Lambda = \frac{\lambda}{\sin\theta_1 - \sin\theta_2}$$

where $\Lambda$ is the pitch, $\lambda$ is the wavelength of the laser and $\theta_1$ and $\theta_2$ are the angles of incidence of both beams with respect to the normal of the recording plane.

This method has many drawbacks. To collimate a beam, the initial small diameter laser beam is firstly cleaned and made divergent by the use of a spatial filter composed of a microscope objective and a pinhole. A lens or a parabolic mirror of proper diameter and focal length is then used to collimate the diverging beam. If this lens or mirror does not have a very good surface quality, the resulting beam will be noisy and some speckle pattern will be recorded in the grating, thereby generating noise in the application. Also, since the laser beam generally has a gaussian intensity profile, the beam must be sufficiently expanded in order to have a quasi-uniform illumination over the entire recording area. These problems are of more importance if large (over 50 mm) gratings are to be manufactured. The bigger the grating, the larger the optics.

In order to eliminate the noise problem, one can use non-collimated light. Using diverging beams, directly from the spatial filters, assures noise-free gratings. The problem with this configuration is that the pitch of the produced grating is not uniform. It has a hyperbolic-like pitch variation. European patent application no. 0 682 272 (MASANORI et al) discloses a grating manufacturing method using diverging beams. Although this technique is generally known in the field, it gives recording conditions to obtain less than 1% of variation in the recorded pattern interval.

Yet another problem for the two expanded (collimated or not) beams configuration is the stability of the interference pattern on the recording plane. Mechanical vibrations and air movements will cause some distortion or fringe displacement in the sinusoidal pattern. If this displacement is over a tenth of the pitch of the grating, the exposure will tend to erase itself by averaging of intensity. Again, the larger the recording area, and the longer the optical path of each beam, the more difficult it is to have a stable system. Although some stabilisation techniques are currently available (see for example FRELJLICH et al., Appl. Opt. 27(10), 1967 (1988) or TYUCHEV et al., J.Opt. Techno. 61(11), 839 (1994)), they will generally stabilise the pattern in a small area close to the recording area and will not assure stability over the full recording area.

To eliminate the need for large collimating optics, MOLLERNAUER, TOMLINSON, Appl. Opt. 16(3), 555 (1977) presents a technique using small scanning laser beams. Using a beamsplitter and a very flat mirror, the beam is split into two beams, which are then redirected to interfere on the recording plane. By precisely moving the mirror laterally, it is possible to move the interference area over the whole recording surface without disturbing the interference pattern. The drawbacks of this technique are that it requires a very stable linear translation stage to move the scanning mirror, because any angular deviation (as low as $10^{-4}$ rad) will displace the interference pattern, which will erase itself by averaging.

Another configuration is based on a grating interferometer that uses a single point source and three hyperbolic gratings, such as disclosed in U.S. Pat. No. 5,394,266 (HIBINO). These three gratings are made by using standard two-point source interferometers as discussed earlier. By proper combination of a diverging point source and the three hyperbolic gratings, the curvature of the incident spherical wavefront, diffracted by the hyperbolic gratings results in an almost distortion-free interference pattern on a photosensitive layer. The resulting recorded grating has a very low grating line distortion compared to the standard two-point source interferometer. Also a grating interferometer with three gratings does not require a highly coherent source. A quasi-monochromatic light source is sufficient, since each of the two rays interfering in the recording plane is generated from a single point on the first grating. Using a low coherence source also reduces the noise recorded in the grating, since the optical path length of the diffused or scattered light (by imperfections on the gratings surfaces) is different from the optical path length of the recording light beams, thus lowering the speckle effect. The main disadvantage of this technique is that it requires a very tight alignment since a low coherence source is used. Of course, a highly coherent laser light can be used but then a higher noise may be generated.

Another kind of grating interferometer uses only a single grating, commonly called a phase mask. As presented in U.S. Pat. No. 5,367,588 (HILL et al), the phase mask is held in close proximity to the recording plane (an optical fibre in this specific case). The laser illumination of this mask will generate two main diffraction orders (other diffraction orders are weak). These two beams overlap in a small region close to the mask, generating the interference pattern, having a pitch half of the mask pitch. This configuration is very stable and does not require a laser with a very high coherence, since the interference zone is close to the mask.

In this technique, the whole length of the recording area is illuminated simultaneously. Based on the same phase mask principle, MARTIN, OUELLETTE, Elec. Lett., 30, 811 (1994) uses a translating focused illuminating beam to record the length of the grating, so that one does not need to expand the laser beam for writing longer gratings. Since the recording layer (again an optical fibre) is held in contact with the phase mask, the phase of the fringe pattern has a very low sensitivity to beam angular displacement so that a standard translation stage is sufficient to move the beam along the phase mask-fibre assembly. This technique also allows local control of the exposure level by varying laser light intensity or scanning speed.

The phase mask technique is very efficient for writing gratings in optical fibres. But to manufacture gratings for spectroscopic applications, the noise generated by higher order of diffracted orders during recording, will decrease the overall performance of the gratings.

U.S. Pat. No. 5,066,133 (BRIENZA) discloses a technique for producing extended length gratings using an endless strip grating in the form of a loop. A laser light passing through this grating is split into two beams, which are then redirected to interfere on an optical fibre to record a grating. By moving the strip grating at exactly the same speed as the optical fibre, the interference pattern stays stationary relative to the fibre so that an almost infinite length grating can be written. Although this principle seems interesting, there may be problems to maintain the exact same speed for both moving parts and the generation of a long flexible strip grating is not a trivial task, since all the defects in the strip grating will be transposed into the fabricated fibre grating.

Some applications may require an arbitrary non-uniform diffraction efficiency profile, which may be obtained by scanning a slit mask in front of the recording plane, when large beams are used. Varying the speed of the slit or the intensity of the light then controls exposure level. This slit scanning technique is well documented for photolithographic processes for uniformly exposing large patterns (see U.S. Pat. No. 4,924,257 (JAIN), U.S. Pat. No. 5,291,240 (JAIN), U.S. Pat. No. 5,473,410 (NISHI) and U.S. Pat. No. 5,663,784 (TANIMOTO)). Instead of using large, well corrected illuminating and imaging systems, a smaller field is used, delimited by a slit having a proper shape. The mask and the photosensitive plate are then scanned in a direction so that an area in the form of a band is illuminated. By proper choice of slit shape, parallel bands can be partially overlapped in order to seamlessly expose the entire desired area. A non-holographic moving mask technique has been demonstrated (CHEN et al., SPIE 2687, 142 (1996)) for producing gratings of an arbitrary section profile using imaging photolithography. Although this technique is fairly simple, it may be limited to large pitch gratings (over 10 μm).

OBJECT AND SUMMARY OF THE INVENTION

It is therefore an object of the present invention to propose a method for recording diffraction gratings or the like in a photosensitve medium that allows real-time monitoring of the writing beam intensity.

It is a further object of the invention to propose such a device that is adapted for holographic recording.

It is also an object of the invention to provide a method for allowing the real-time monitoring of the intensity of a writing light beam for recording an interference pattern in a photosensitive medium.

It is another object of the invention to provide a scanning slit device for recording an interference in a photosensitive medium.

Accordingly, the present invention provides a device for recording an interference pattern in a photosensitive medium, comprising:

means for producing two light beams along different paths;

diffraction gratings respectively disposed in the paths of the two light beams to diffract each of said light beams into a recording beam and a corresponding monitoring beam along different paths, each recording and monitoring beams having a given intensity, the intensity of each recording beam being related to the intensity of the corresponding monitoring beam, the recording beams being incident on a recording location on the photosensitive medium and interfering at said recording location to produce the interference pattern recorded therein; and photo-detectors respectively disposed in the paths of the monitoring beams to detect the intensity thereof and allowing a monitoring of the intensity of the corresponding recording beam.

Preferably, in the device according to the above embodiment, the means for generating the two light beams comprise;

a laser adapted to generate a primary light beam along a path;

an electronic shutter in the path of said primary light beam;

a polarisation rotator, also in the path of the primary light beam;

a light modulator, also in the path of the primary light beam;

a microscope objective and a pinhole disposed in the path of the primary light beam downstream the electric shutter, polarisation rotator and light modulator, for spatially expanding said primary light beam to produce an expanded light beam; and a source opaque screen provided with two openings therein, the two openings being disposed in the path of the expanded light beam, in operation, light from the expanded light beam going through the two openings to produce the two light beams, and the device further comprises:

a recording opaque screen, disposed in the path of both recording beams proximate to the photosensitive medium, the recording opaque screen having an opening therein aligned with the recording location on said photosensitive medium; and translating means for concurrently translating the source opaque screen, the recording opaque screen and the photo-detectors being in a direction parallel to the photosensitive medium.

Also, in accordance with the present invention, there is provided a method for recording an interference pattern in a photosensitive medium, comprising steps of:

(a) producing two light beams along different paths;

(b) propagating said light beams through corresponding diffraction gratings, each of the light beams being diffracted into a monitoring beam and a corresponding recording beam along different paths, each recording and monitoring beams having a given intensity, the intensity of each recording beam being related to the intensity of the corresponding monitoring beam;

(c) impinging the recording beams on a recording location on the photosensitive medium, said recording beams interfering at said recording location to produce the interference pattern which is recorded therein; and (d) detecting the intensity of each monitoring beam to monitor the intensity of the corresponding recording beam.

Preferably, in the above method, step (a) further comprises steps of:

producing an expanded light beam; and propagating the expanded light beam through a pair of slits provided in a source opaque screen to produce the two light beams.

In accordance with such an embodiment, step (c) may further comprise a step of limiting a recording location of the photosensitive medium by providing a recording opaque screen in front of the photosensitive medium in proximity thereto, said recording opaque screen having a slit therein in alignment with the paths of both recording beams.

In step (d) of such a method, the intensity of each monitoring beam is preferably detected by means of photodetectors.

Preferably, the above comprises an additional step of (e) concurrently translating at a translation speed the source opaque screen, the recording opaque screen, and the photodetectors in a direction parallel to the photosensitive medium. The present invention also provides another device for recording an interference pattern in a photosensitive medium, comprising:

means for producing an expanded light beam;
diffraction means for diffracting light from the expanded light beam;
a source opaque screen provided with two openings limiting light diffracted by the diffraction grating to two sets of diffracted beams, each set of diffracted beams including a recording beam converging toward a recording location on the photosensitive medium;
a recording opaque screen provided with an opening situated at the recording location; and
translating means for concurrently translating the source opaque screen and the recording opaque screen in a direction parallel to the photosensitive medium.

Advantageously, the present invention may provide a very efficient way of using a scanning slit technique for holographic grating fabrication and a real time monitoring and control of all parameters of the system, allowing easy fabrication of uniformly or non-uniformly exposed gratings, practically independent on illumination uniformity. The interferometer is also very stable, easy to align, produces low noise gratings and is very efficient for writing high accuracy small pitch gratings.

The present invention and its advantages will be better understood upon reading the following non-restrictive description of embodiments thereof with reference to the accompanying drawings.

DESCRIPTION OF PREFERRED EMBODIMENTS

Devices According to the Invention

Figure 1:
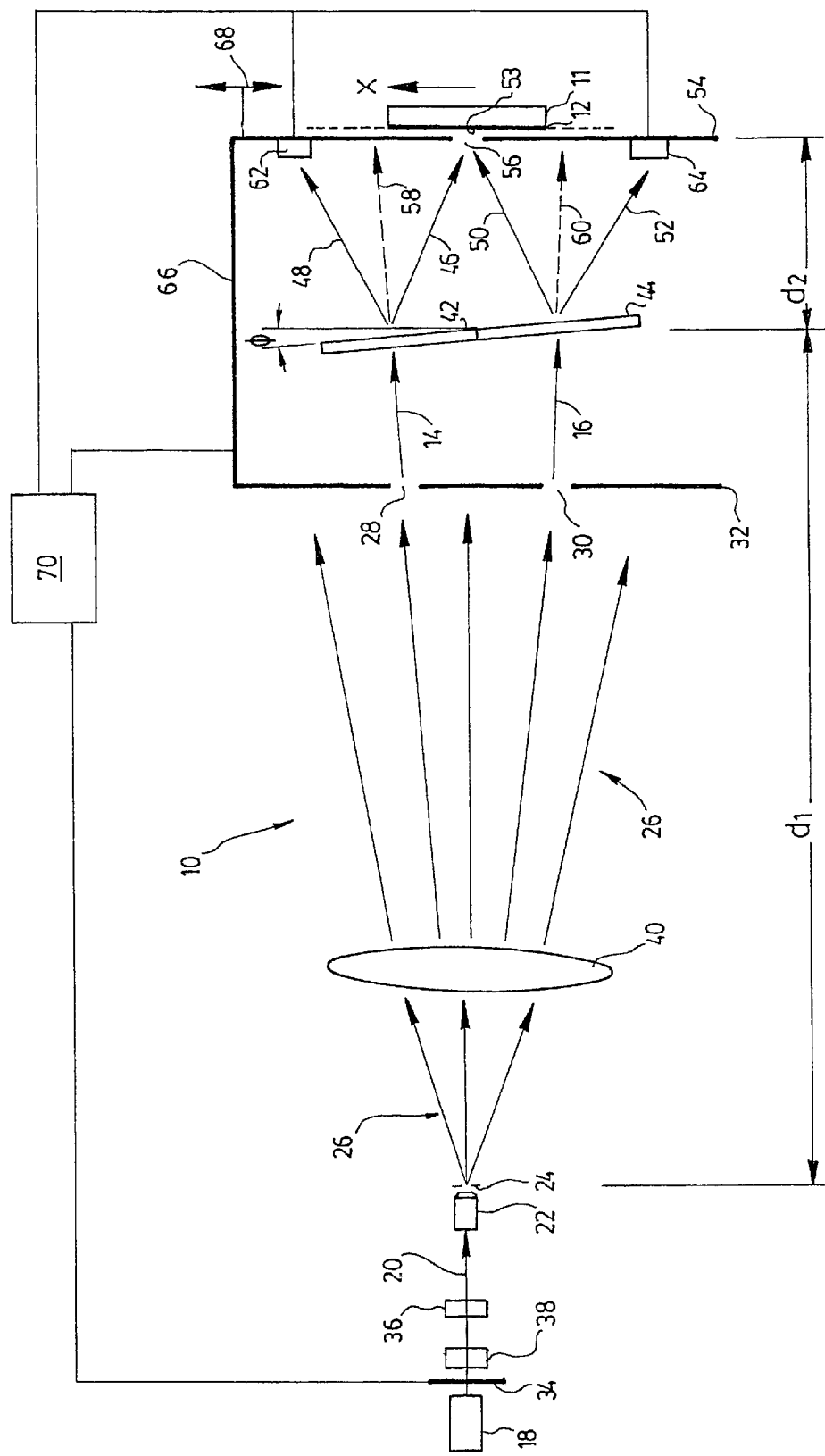
FIG. 1 is a schematic view of a device according to a preferred embodiment of the invention.

FIG. 1 shows a device 10 according to a preferred embodiment of the invention, adapted for recording holographic gratings in a photosensitive medium 12. It is however understood that the present invention may be applied to produce all kinds of optical elements implying the modification of the properties of such a medium by exposing this medium to interfering light beams. The photosensitive medium 12 may be any appropriate medium such as a layer of photoresist, dichromated gelatin, silver halide or photopolymer deposited on a substrate 11. Alternatively, the photosensitive medium may be a length of optical fiber.

In accordance with the embodiment of FIG. 1, the device 10 preferably includes means for producing light beams 14 and 16 along different paths. The two light beams 14 and 16 preferably originate from a laser 18 generating a primary light beam 20 which is then divided into the two light beams 14 and 16. In the illustrated embodiment of FIG. 1, the primary light beam 20 is first spatially expanded by going through a microscope objective 22 and a pinhole 24, producing an expanded light beam 26, this expanded light beam 26 being then divided by going through two slits 28 and 30 provided in a source opaque screen 32 disposed in the path of the expanded light beam 26. The two light beams 14 and 16 are therefore respectively generated by light going through slits 28 and 30. Other optical elements may be provided as needed in the optical set-up described above, such as electronic shutter 34, polarisation rotator 36 and intensity modulator 38, all disposed in the path of the primary light beam 20. A lens 40 may also be provided in the path of the expanded light beam 26. The lens 40 may alternatively be replaced by a spherical or aspherical mirror, in a reflective configuration. The result is a convergent, divergent of collimated expanded beam 26, depending on lens and mirror alignment.

In accordance with the embodiment of FIG. 1, a first diffraction grating 42 is disposed in the path of light beam 14, and a second diffraction grating 44 is similarly disposed in the path of the light beam 16. In an alternative embodiment, the diffraction gratings 42 and 44 may be integral to each other, forming a single grating long enough to intercept the paths of both the first and second light beams 14 and 16. The diffraction gratings 42 and 44 may be of any known type, such as uniform-pitch gratings or chirped gratings, as would be appropriate for the particular application desired. Anti-reflection coating may also be provided at least on the non-grating face of each diffraction grating 42 and 44. Each of the diffraction gratings 42 and 44 diffracts the corresponding light beam into at least two orders of diffractions, including the transmitted zero order. In this manner, light beam 14 going through the first diffraction grating 42 produces at least diffracted beam 46 and 48, light beam 16 going through the second diffraction grating 44 produces diffracted beam 50 and 52. The intensities of the diffracted beams of each pair are related, in such a manner that it is possible to deduce the intensity of one of the diffracted beam of a pair by measuring the intensity of the other. In the ideal case, both intensities are the same.

In operation, the diffracted beams 46 and 50, hereinafter referred to as "recording beams", are incident on a recording location 53 on the photosensitive medium 12. The interference of these two beams together generates an interference pattern, which is recorded in the photosensitive medium 12. Each of the other diffracted beams 48 and 52 is incident on a corresponding photo-detector, first photo-detector 62 thereby measuring the intensity of the diffracted beam 48 and second photo-detector 64 measuring the intensity of the diffracted beam 52. In this manner, the intensity of the recording beams 48 and 50 may be readily calculated and monitored during the recording operation. Beams 48 and 52 are therefore referred to as "monitoring beams".

Preferably, a recording opaque screen 54 is disposed into the path of the recording beams 46 and 48, in near proximity to the photosensitive medium 12. A recording slit 56 is provided in the recording opaque screen 54, and in operation the screen 54 is disposed so that the recording slit 56 is aligned with the recording location 53 on the photosensitive medium 12. The recording opaque screen 54 allows to limit the recording area on the photosensitive medium 12 to the size and shape of the recording slit 56, and it may serve to block light from the unwanted transmitted zero order diffracted beams 58 and 60 coming from each grating 42 and 44 in the case where the diffracted beams 46, 48, 50 and 52 used for recording and monitoring are the −1 and +1 diffraction orders.

The device 10 of FIG. 1 may be used to write long gratings using a scanning slit technique. For this purpose, a motorized linear translation stage 66 is provided, for concurrently translating the source opaque screen 32, the recording opaque screen 54 and the photo-detectors 62 and 64 in a direction 68 parallel to the photosensitive medium 12. By moving both screens 32 and 54 simultaneously and at the same speed in a direction 68 parallel to the photosensitive medium 12, the interference area is displaced. With the laser 18, gratings 42 and 44 and photosensitive medium 12 rigidly fixed together, and with only the three openings 28, 30 and 56 moving, the interference pattern remains fixed relative to the recording location 53, thus allowing the recording of a long grating in the photosensitive medium 12 along the path of the moving recording slit 56. This configuration gives a very stable system. The motorised linear translation stage is preferably controlled by a computer 70. This computer 70 also controls the electronic shutter 34 for opening or closing the laser 18 illumination and is equipped with an acquisition system to read the photo-detectors 62 and 64 intensities. In a variant, further described hereinafter, another motorised linear translation stage may also be used to move the screens 32 and 54 vertically, in order to record multiple overlapping bands.

Figure 8:
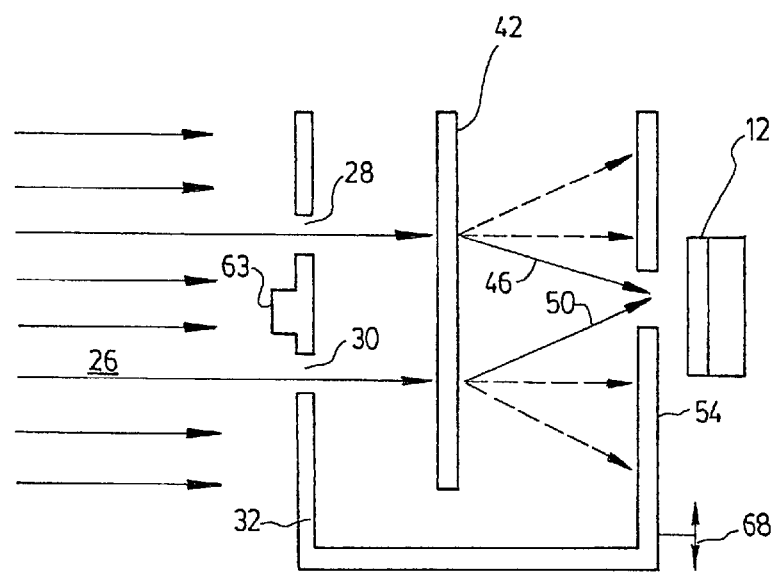
FIG. 8 is a schematic view of a device according to another embodiment of the invention.
Figure 9:
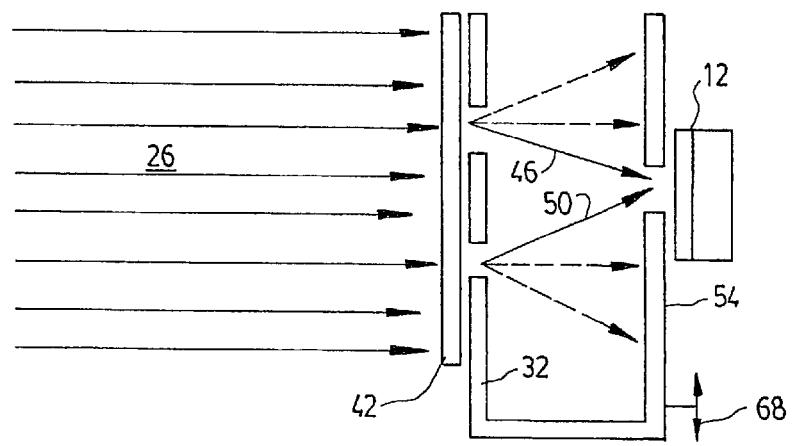
FIG. 9 is a schematic view of a device according to yet another embodiment of the invention.

Referring to FIGS. 8 and 9, if the monitoring of the recording beams is not of concern, the above explained scanning slits system may be used without the photodetectors 62 and 64. Such a system is shown in FIG. 8. In this embodiment, a single detector 63 may be placed on the opaque source screen to detect the overall intensity fluctuations of the expanded beam 26. Alternatively, as shown in FIG. 9, the opaque screen may be placed downstream the grating, thereby limiting light leaving the grating instead of light incident thereon.

To control local exposure levels, the basic configuration relies on varying the translation speed of the slits 28, 30 and 56. The modulation of the sinusoidal shaped interference pattern recorded in the photosensitive medium 12 may be approximated by $$M = K \frac{\sqrt{I_1 I_2}}{v} l \quad \text{(Eq. 1)}$$

where $I_1$ and $I_2$ are the individual intensity of recording beams 46 and 50 (given by the intensity of the monitoring beams 48 and 52 as detected by the photo-detectors 62 and 64) incident on the recording slit 56, v is the translation speed of the screens 32 and 54, l is the width of the slit 56 and K is the response function of the photosensitive medium 12. This equation is valid if the intensities can be approximated as constant over the width of the slit 56 and if the required modulation is slowly varying compared to the slit's width. Using this equation, it is easy to calculate the required instantaneous speed of the screens 32 and 54 in function of individual intensities and system parameters to obtain the desired local modulation.

To have a seamless overlapping between consecutive bands, two rotating wheels having a special shape may be used. The wheels overlap the slit 56, one at the top of the slit, the other at the bottom of the slit. The wheels have a variable radius profile so that when they turn, usually at a fast rate, the average transmission of the single slit varies along its length, thus profiling the vertical exposure level. By proper choice of wheel shape, one can easily obtain the desired vertical illumination profile. Such an embodiment is described in detail hereinafter.

The diffraction gratings 42 and 44 used in this embodiment are not limited to uniform pitch gratings. Linear or non-linear chirped gratings can also be used. The periodicity of the interference pattern depends on the collimation level of the source, pitch and chirp (if any) of the gratings, and parallelism between the gratings and the plane of the photosensitive medium. Given below are some examples of the use of different types of gratings and different collimation levels of the expanded light beam 26.

EXAMPLE 1

A perfectly collimated source, used with a grating of perfectly uniform pitch will generate a perfectly uniform pitch pattern. The pitch of this pattern will be half of the pitch of the diffraction gratings if both gratings and recording planes are parallel. If the collimated source is perpendicular to the recording plane and the gratings are rotated by an angle φ about an axis perpendicular to the diffraction plane, the resulting pitch will be slightly smaller than half the pitch of the grating. If the collimated source is perpendicular to the grating and the recording plane is rotated about an axis perpendicular to the diffraction plane, the resulting pitch will be slightly larger (1/cos) than half the pitch of the grating.

EXAMPLE 2

The use of a chirped grating will result in a chirped interference pattern with a chirp and central pitch about half the pitch of the grating.

EXAMPLE 3

Using a diverging illuminating beam with an unchirped grating will result in a parabolic shaped periodicity with a central pitch about half the pitch of the grating. For many applications, the parabolic may be negligible so that the resulting pitch may be considered uniform. Also, the exact central pitch depends on the distance between the point source and the grating, and on the distance between the grating and the recording plane. Precise tuning of the central period can be done by moving the point source along the optical axis of the illuminating beam.

EXAMPLE 4

Starting with example 3, if the grating is rotated about an axis perpendicular to the diffraction plane, a quasi-linear chirp may be produced.

The possibilities of the present invention are not limited to these few examples. Other types of configurations are possible, such as using two different diffraction gratings.

Figure 2:
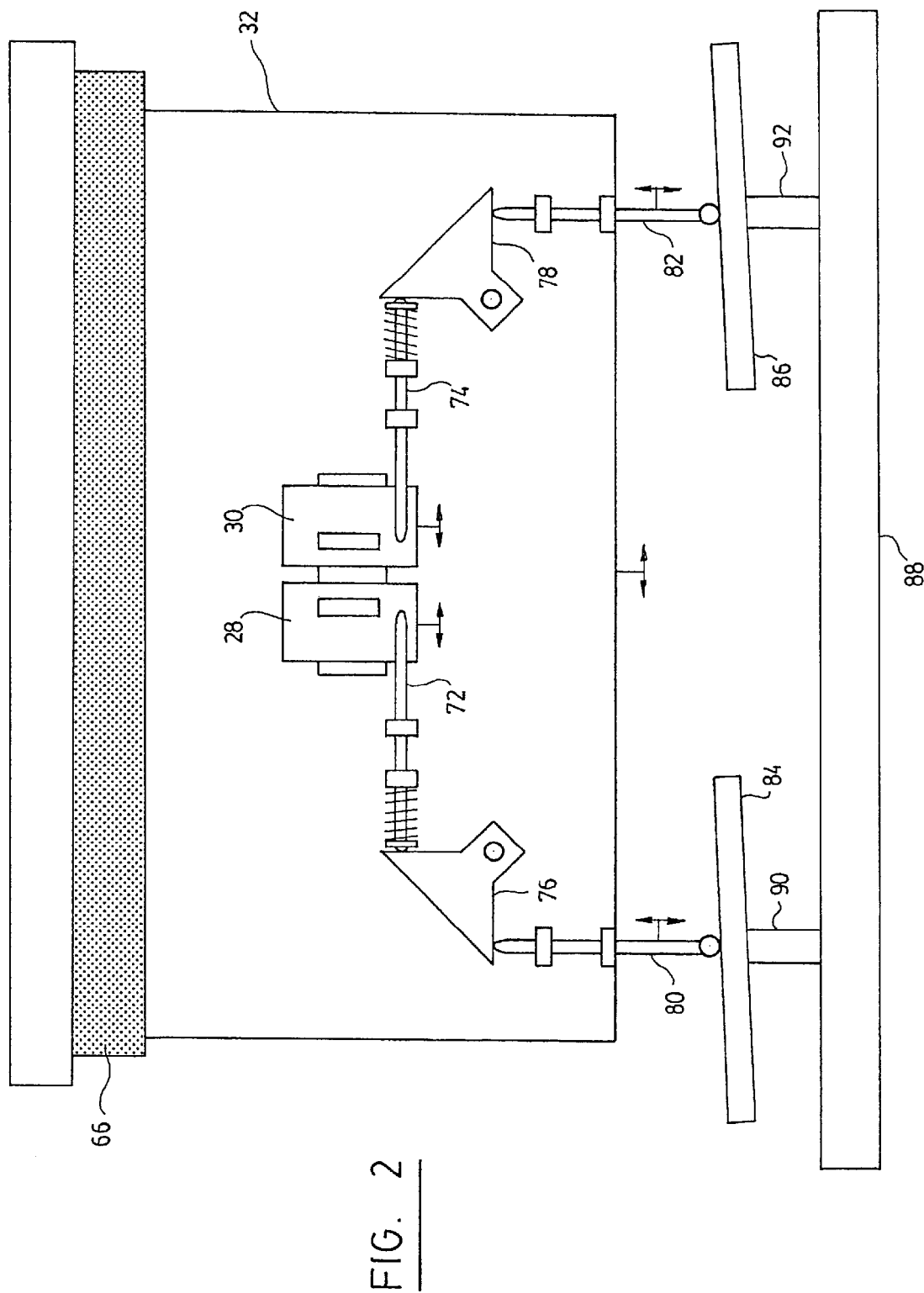
FIG. 2 is a schematic view of a mechanical system for moving a pair of slits relative to the displacement of the source opaque screen shown in the embodiment of FIG. 1.

For configurations that use non-collimated expanded beams 26, or rotated gratings 42 and 44, the angle of diffraction of the recording beams 46 and 50 may not be constant over the whole recording length, and neither will the distance between the diffraction gratings 42 and 44 and the recording slit 56 be constant. This implies that the overlapping of the recording beams 46 and 50 won't be maintained on the recording slit 56 if the position of the two slits 28 and 30 on the source opaque screen 32 are fixed relative to the position of the recording slit 56 on the recording opaque screen 54. In order to overcome this problem, a technique was developed to move the slits 28 and 30 relative to the displacement of both screens 32 and 54. FIG. 2 shows the mechanical principle of this relative displacement system. The laterally moving slits 28 and 30 are connected to spring loaded rods 72 and 74. Special 90° pivoting plates 76 and 78 allow the vertical movement of rods 80 and 82 to be translated into horizontal movement of rods 72 and 74. During the recording process of scanning, the source opaque screen 32 is moved by the motorised translation stage 66. The vertical rods 80 and 82 slide on the rails 84 and 86, rigidly fixed to the stabilised optical table 88 by the posts 90 and 92. The rails 84 and 86 have either an inclined linear shape or curved shape. Lateral displacement of the screen 32 causes a change in the local height of the rails 84 and 86, thus pushing vertically the rods 80 and 82, resulting in the end in a horizontal displacement of the slits 28 and 30. The shape and inclination of the rails 84 and 86 are adjusted in order to constantly maintain the overlap of the recording beams 46 and 50 directly on the slit 56. A similar relative displacement system must also be used by the photo-detectors 62 and 64 on the recording opaque screen 54 in order to follow the relative displacement of the monitoring beams 48 and 52.

The embodiments described hereinabove have been limited to recordings of gratings in the form of a band. The length of the band is mainly limited by the size of the diffraction gratings 42 and 44, and the height by the height of the recording slit 56. If the vertical size of the diffraction gratings 42 and 44 is a few times larger than the height of the recording slit 56, it is possible to sequentially record parallel bands at different height positions. To do so, there is needed a vertical translation stage in order to move the screens vertically. An example of a vertical translation stage that may be used for such an embodiment is shown in FIG. 3.

Figure 3:
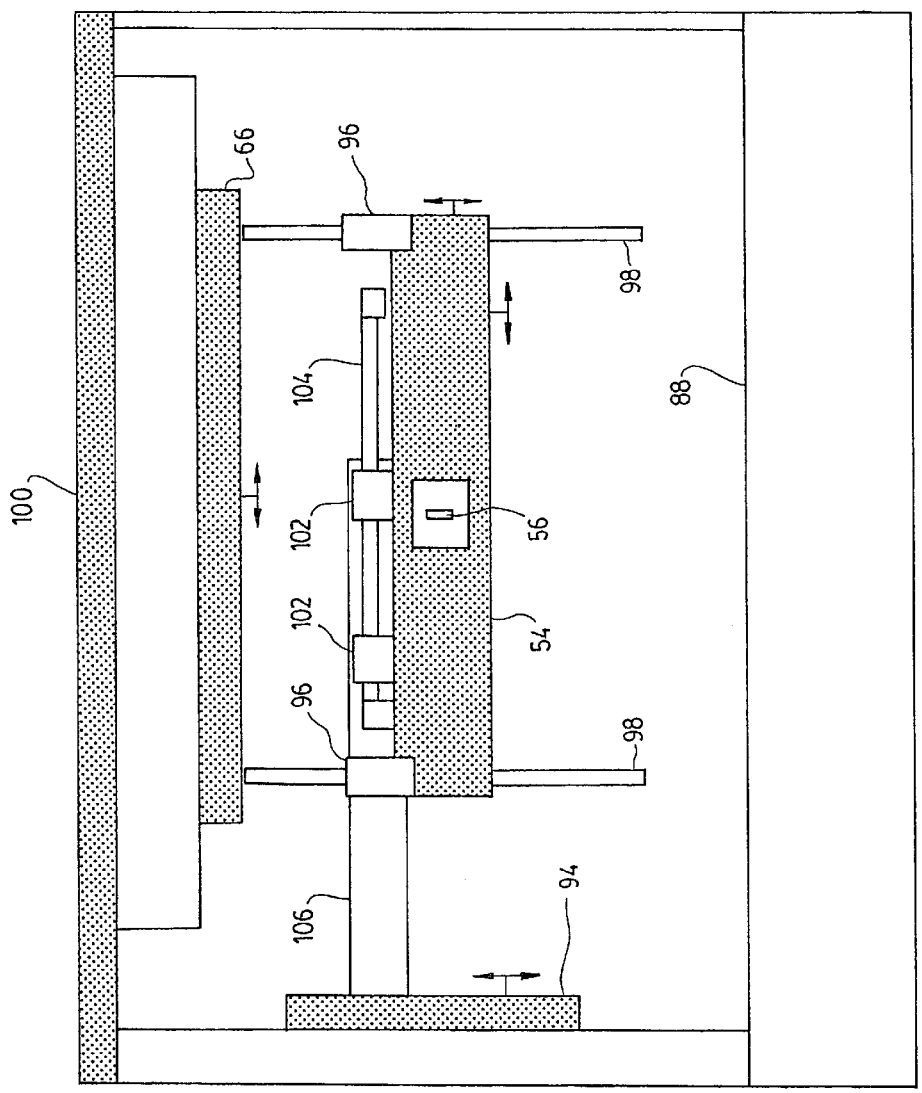
FIG. 3 is a schematic view of a mechanical system for horizontally and vertically translating slits shown in the embodiment of FIG. 1.

Referring to FIG. 3, there is shown a vertical translation stage 94 and accompanying system based on a principle where linear bearings on two axis guiding rails are used in order to minimise the displaced weight. The recording opaque screen 54, which contains the recording slit 56, is guided vertically by linear bearings 96, sliding on vertical rails 98, which are fixed to the horizontal translation stage 66, held upside down on a top plate 100, rigidly mounted on the stabilised optical table 88. The horizontal guiding is done with linear bearings 102, fixed to the screen 54, sliding on a single horizontal rail 104, attached to an arm 106 fixed on the vertical translation stage 94.

Figure 6A:
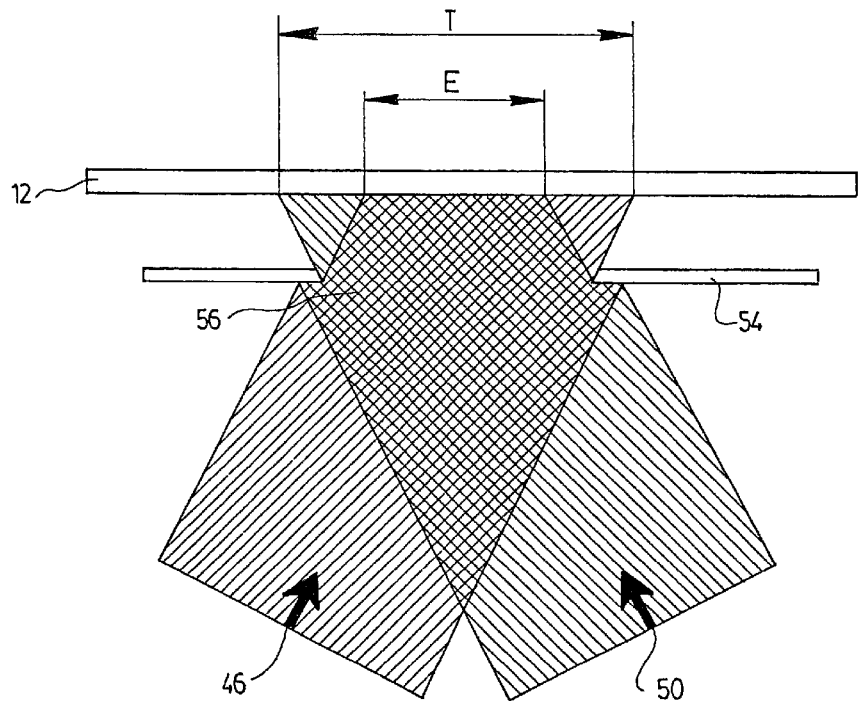
FIGS. 6A and 6B are schematic representations of the shadowing effect of different recording slits.
Figure 6B:
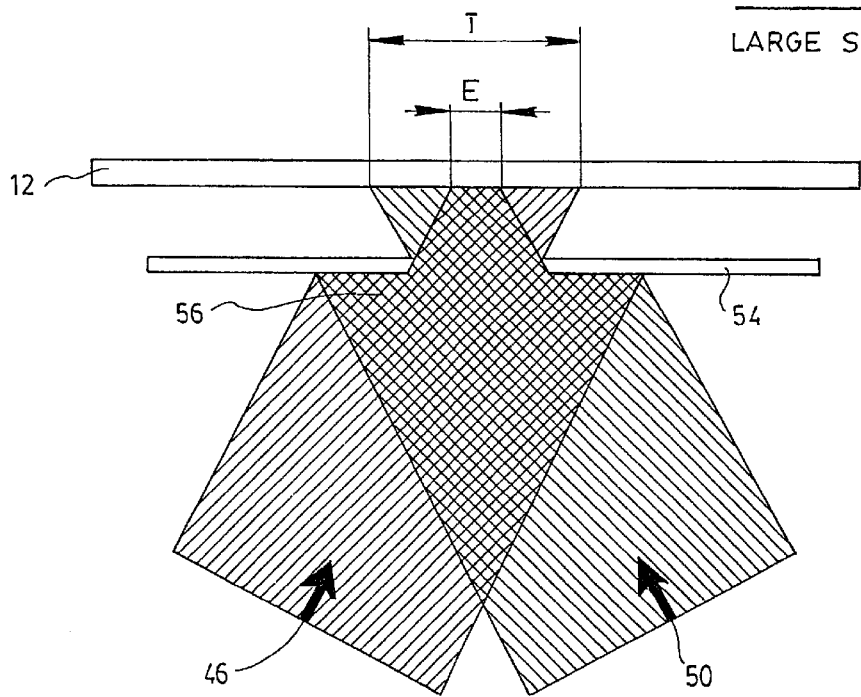
Figure 7:
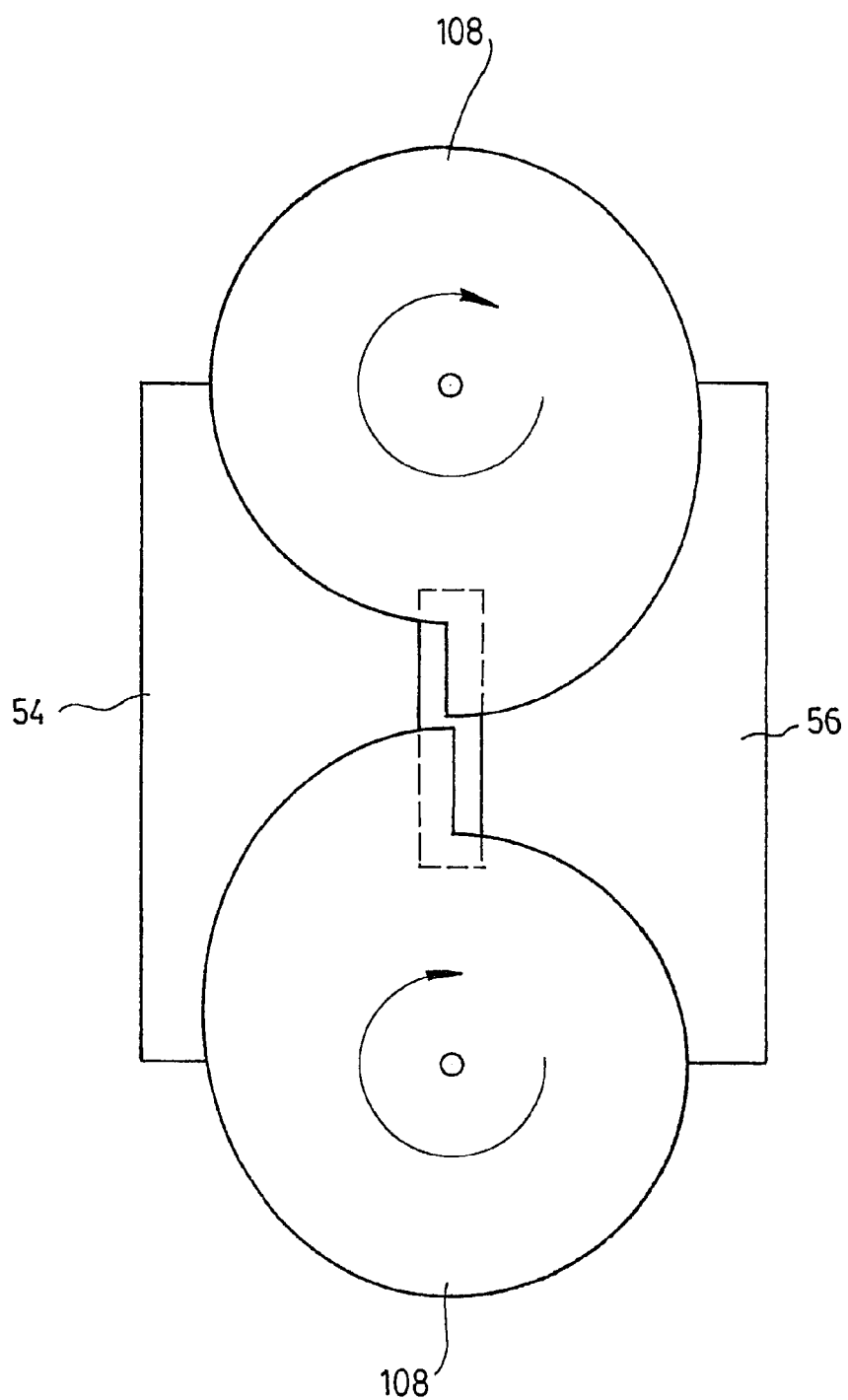
FIG. 7 is a schematic representation of a vertical exposure profiling system.

To increase the vertical size of the fabricated grating, a number of parallel bands can be stitched vertically. The stitching, or juxtaposition of bands will generally leave some stratification or apparent seam between consecutive bands. To obtain a seamless grating, one needs to partially overlap the bands. In this case, a proper vertical exposure profile must be designed. The technique of using a profiled recording slit 56, having narrower extremities, is well known in projection lithographic systems. But, this technique may not be appropriate for interferometric recordings. Since the recording slit 56 is not in perfect contact with the photosensitive medium 12 on the recording plane, a shadowing effect occurs, which increases as the slit 56 gets narrower, especially in the ends of the slit 56. FIG. 6 is a schematic representation of the shadowing effect. We can see that for narrow slit 56, the effective interference area E can be small relative to the whole exposed area T. Of course, the shadowing effect can be compensated by proper shape design, but the design is limited to a specific distance between the slit 56 and the photosensitive medium 12 and a specific angle of incidence of both the first and the third diffracted beams 46 and 50. In order to overcome these limitations, there is proposed another way of controlling the vertical exposure profile. FIG. 7 shows a schematic representation of the technique. A single rectangular recording slit 56 is used with an extended height. Two profiled wheels 108, one at each extremity of the slit 56, behind the slit 56, are rotating at a fast rate. The wheels 108 have a continuously variable radius. When the smallest radius is in front of the slit 56, the desired full height of the slit 56 is exposed and when the largest radius is in front of the slit 56, the desired minimum height of the slit 56 is exposed. The variation of the radius between the two extremes will give the vertical exposure profile. With the wheels 108 rotating at a fast rate, the average exposure as a function of the vertical position depends on the shape of the wheel 108. Since the width of the recording slit 56 is the same everywhere, the shadowing effect is uniform and is of no concern. To obtain a seamless grating, it was found that a gaussian vertical exposure profile gives very good results and is not too sensitive on vertical positioning errors, since the profile is very smooth. For a gaussian exposure profile in the form:

$$E(z) = \exp\left(-\frac{z^2}{w^2}\right) \qquad \text{(Eq. 2)}$$

where w is the half width when $E(z)=1/e$, if the vertical separation between consecutive bands is equal or less than w, then the stratification will be minimised.

Methods According to the Invention

The present invention also provides a method for modifying the properties of a photosensitive medium. As for the device described above, the embodiment of the method described herein is adapted for the recording of a holographic grating in the photosensitive medium, but other applications may be readily devised.

In accordance with the preferred embodiment, the method of the present invention comprises the following steps.

The first step (a) includes producing two light beams along different paths. Preferably, the first and second light beam come from an expanded light beam that propagates through a pair of slits provided in a source opaque screen.

Step (b) includes propagating the two light beams through respective diffraction gratings, the diffraction of each light beam producing a recording beam and a corresponding monitoring beam along different paths. The intensity of each recording beam is related to the intensity of the corresponding monitoring beam since they are generated from the same grating.

Third step (c) includes impinging the recording beams on a recording location on the photosensitive medium, the recording beams interfering at this location to produce the interference pattern which is recorded therein. The recording location on the photosensitive medium is preferably limited by providing a recording opaque screen in front of the photosensitive medium in proximity thereto, the recording opaque screen having a slit therein in alignment with the paths of both recording beams.

Step (d) includes detecting the intensity of monitoring beams to monitor the intensity of the recording beams. A photo-detector is preferably provided to detect each monitoring beams.

Finally, step (e) includes concurrently translating at a translation speed the source opaque screen, the recording opaque screen, and the photo-detectors in a direction parallel to the photosensitive medium. Either the translating speed or the polarisation of the light beams may be varied to generate an amplitude modulation profile of the interference pattern. The intensities detected in step (d) can be used to adjust the operation parameters as necessary. The slits in the source opaque screen may be displaced relative to each other as the whole screen is translated, to keep the recording beams in alignment with the recording location as necessary with some types of gratings. The photo-detectors are, in this embodiment, moved at different speeds to be kept in the respective paths of the monitoring beams.

After exposure, the photosensitive medium is properly processed, depending on the photosensitive material used, in order to reveal the recorded grating.

A preferred method of calculating the translation speed as a function of the desired modulation profile in light of the different parameters of the system will now be described.

The exposure intensity I(x) along the length of the recording area may be calculated by $$I(x) = I_1(x) + I_2(x) + 2\sqrt{I_1(x)I_2(x)} \quad \text{(Eq. 3)}$$
$$\cos(2\pi x[\sin(\theta_1) - \sin(\theta_2)]/\lambda)[\cos^2\beta + \sin^2\beta\cos(\theta_1 - \theta_2)]$$

Where $I_1(x)$ and $I_2(x)$ are respectively the instantaneous individual intensity of the first and third diffracted beams, $\theta 1$ et $\theta 2$ are respectively the angle of incidence of the monitoring beams relative to the normal of the plane defined by the diffraction gratings, $\lambda$ is the wavelength of the laser and $\beta$ is the polarisation angle (0° being TE and 90° being TM polarisation). From this equation, the amplitude A(x) of the sinusoidal interference pattern is $$A(x) = 2\sqrt{I_1(x)I_2(x)}\,[\cos^2\beta + \sin^2\beta\cos(\theta_1 - \theta_2)] \quad \text{(Eq. 4)}$$

While the contrast is $$C(x) = \frac{A(x)}{I_1(x) + I_2(x)} \quad \text{(Eq. 5)}$$

For a moving slit of width l, the exposure level $E(x_c)$ at a position $(x_c)$ is $$E(x_c) = \int_{x_x - \frac{1}{2}}^{x_x + \frac{1}{2}} l \frac{I(x)}{v(x)} dx \quad \text{(Eq. 6)}$$

where I(x) is the instantaneous intensity at the centre of the slit, moving at a speed v(x) when the slit is at a position x. Eq.6 is valid if we can consider a uniform instantaneous intensity over the width of the slit, which is easily obtainable with proper expansion of the laser beam.

Now, if we neglect the intensity and speed variation over the interval of integration, Eq.6 becomes $$E(x) = \frac{I(x)}{v(x)} l \quad \text{(Eq. 7)}$$

Using equation 7, it is very easy to calculate the required local speed v(x) to obtain the desired local exposure Ed(X) under local illumination I(x). By inserting equation 7 in equation 6, we find $$E_r(x_c) = \int_{x_x - \frac{1}{2}}^{x_x + \frac{1}{2}} \frac{E_d(x)}{l} dx \quad \text{(Eq. 8)}$$

where $E_r$ is the recorded exposure. We can see that by calculating the speed by equation 7, the recorded exposure is not the same as the desired exposure, unless the slit width l is very narrow.

In order to obtain the desired exposure profile, we have to correct the profile before calculating the speed (with equation 7). What we want is $$E_r(x_c) = E_d(x_c) = \int_{x_x - \frac{1}{2}}^{x_x + \frac{1}{2}} \frac{E_c(x)}{l} dx \quad \text{(Eq. 9)}$$

Where $E_c$ is the corrected exposure profile. The easiest way of solving the problem is by expressing the desired and the corrected exposure profile by a simple polynomial expansion:

$$E_d(x) = \sum_0^{n_{max}} a_n x^n \quad \text{(Eq. 10)}$$

$$E_c(x) = \sum_0^{n_{max}} b_n x^n \quad \text{(Eq. 11)}$$

Polynomial coefficients $a_n$ are known by fitting the polynomial with the desired exposure profile while polynomial coefficients $b_n$ are obtained by inserting equations 10 and 11 into equation 9 and solving by symbolic integration. For a sixth order polynomial ($n_{max}=6$), the result is $$b_0 = a_0 - \frac{1}{12}l^2 a_2 + \frac{7}{240}l^4 a_4 - \frac{31}{1344}l^6 a_6 \quad \text{(Eq. 12)}$$
$$b_1 = a_1 - \frac{1}{4}l^2 a_3 + \frac{7}{48}l^4 a_5$$
$$b_2 = a_2 - \frac{1}{2}l^2 a_4 + \frac{7}{16}l^4 a_6$$

Using these coefficients, we can calculate a corrected exposure profile that will allow easy calculation of the speed with equation 7 and will satisfy equation 9.

In the present embodiment, a grating with a variable modulation profile can be desired. The modulation profile may be in the form of a relief modulation, a refractive index modulation or an absorption modulation. The recorded modulation M, in general, is the product of exposure E with the response function K of the recording material plus a threshold value t:

$$M = KE + t \quad \text{(Eq.13)}$$

The response function may be non-linear and dependent on the modulation M.

To obtain sinusoidal exposure with a desired amplitude modulation profile, we have to take A(x) of equation 4 as the intensity function in equation 7 for calculating the speed of the moving slit. Individual intensities $I_1(x)$ and $I_2(x)$ are obtained by reading the values given by the photo-detectors. In the best case, the gratings diffract the same intensity in both first orders so that the monitoring beams are practically exact replicas of the recording beams. In other cases, the gratings must be so that the ratio of the intensity of the monitoring beams over the corresponding intensity of the recording beams be constant over the whole grating surface. The measured ratios then have to be taken into account in equation 4 when providing the photo-detectors values.

The polarisation angle $\beta$ is known from the polarisation rotator, as well as the angles of incidence $\theta_1$ and $\theta_2$. From equations 4 and 5, we see that the amplitude and the contrast of the sinusoidal interference pattern do not have the same dependence on the variation of the individual intensities. This implies that for a fixed polarisation angle $\beta$ (the recording geometry also implies negligible variations of incidence angles $\theta_1$ and $\theta_2$), independent fluctuations of the individual intensities $I_1(x)$ and $I_2(x)$ may result in a varying contrast of the recording sinusoidal pattern.

The preferred manner of controlling the exposure in order to obtain the desired modulation profile will now be explained for several alternative embodiments of the present invention. Generally, starting with a desired modulation profile, an exposure profile is calculated using equation 13. The exposure profile is then fitted to a proper polynomial expansion (Eq.9). Using equation 12, the corrected profile is calculated. The following cases give the details of this operation using components of the device of FIG. 1.

Case A: The Contrast Variation is Negligible, Speed Control

After opening of the shutter 34, the local individual intensities $I_1(x)$ and $I_2(x)$ are read by the photo-detectors 62 and 64. Using equation 4, A(x) is calculated and then fed into equation 7 with the corrected local exposure level. The speed of the slits 28, 30 and 56 is then calculated and fed into the computer 70 that controls the motorised translation stage 66 that moves the screens 32 and 54. The speed of the slits 28, 30 and 56 is continuously adapted to the local corrected exposure level and exposure intensities until the end of the grating is reached.

Case B: The Contrast Variation is Negligible, Speed Control and Main Illumination Adjustment After opening of the shutter 34, the local individual intensities $I_1(x)$ and $I_2(x)$ are read by the photo-detectors 62 and 64. Using equation 4, A(x) is calculated and then fed into equation 7 with the corrected local exposure level. The speed of the slits 28, 30 and 56 is then calculated. For very small exposure levels, the speed may be too high for good control of the process. So if the required speed reaches some high threshold, the main illumination is lowered by the light modulator 38 at some predetermined level. In the same way, if the required speed reaches some low threshold, the main illumination is increased (if possible) by the light modulator 38 at some predetermined level. A new speed is then calculated (Eq.7) and fed into the computer 70 that controls the motorised translation stage 66 that moves the screens 32 and 54. The speed of the slits 28, 30 and 56 and main illumination level are continuously adapted to the local corrected exposure level and exposure intensities until the end of the grating is reached.

Case C: The Contrast Variation is Negligible, Main Illumination Control and Speed Adjustment After opening of the shutter 34, the slits 28, 30 and 56 start to move at some predetermined speed and the local individual intensities $I_1(x)$ and $I_2(x)$ are read by the photo-detectors 62 and 64. Using equation 4, A(x) is calculated and then fed into equation 7 with the corrected local exposure level. The required exposure intensity is then calculated and adjusted with the light modulator 38. If the required light intensity reaches some high threshold, the speed of the slits 28, 30 and 56 is lowered at some predetermined level. In the same way, if the required light intensity reaches some low threshold, the speed is increased at some predetermined level. A new light intensity is then calculated (Eq.7) and fed into the computer that controls the light modulator 38. The speed of the slits 28, 30 and 56 and main illumination level are continuously adapted to the local corrected exposure level and exposure intensities until the end of the grating is reached.

Case D: Control of Polarisation to Maintain Contrast

Figure 4:
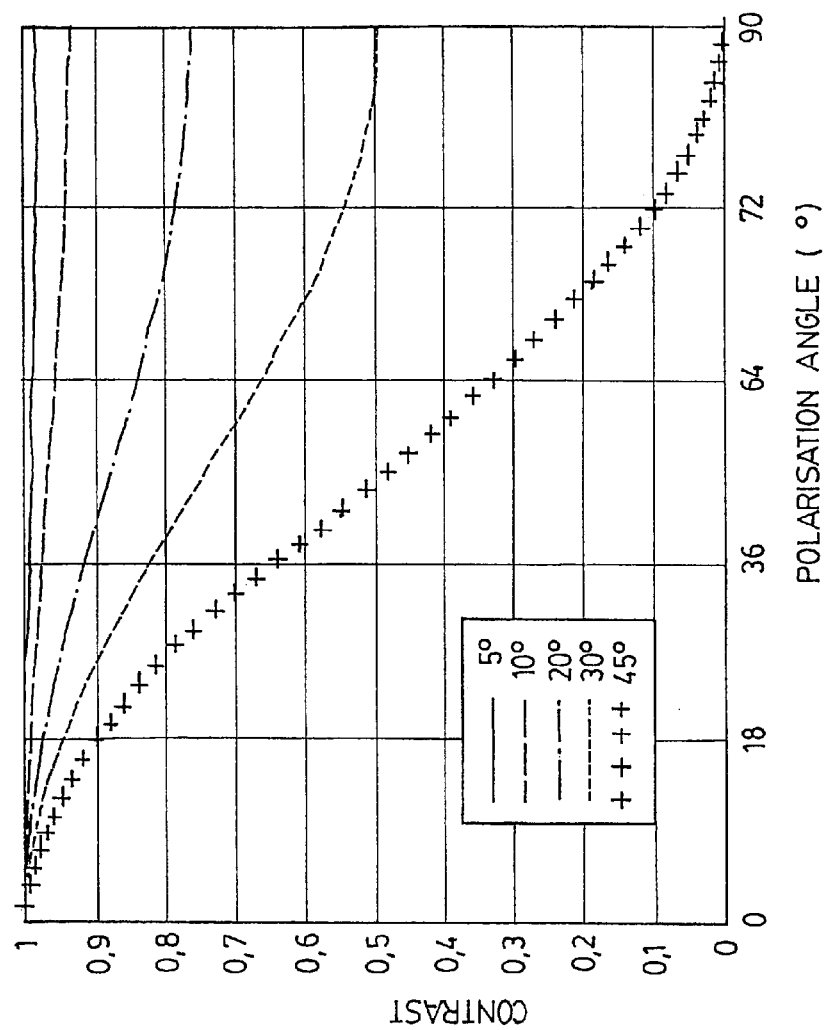
FIG. 4 is a graph showing variations of the contrast of a sinusoidal interference pattern as a function of incidence and polarisation angles.
Figure 5:
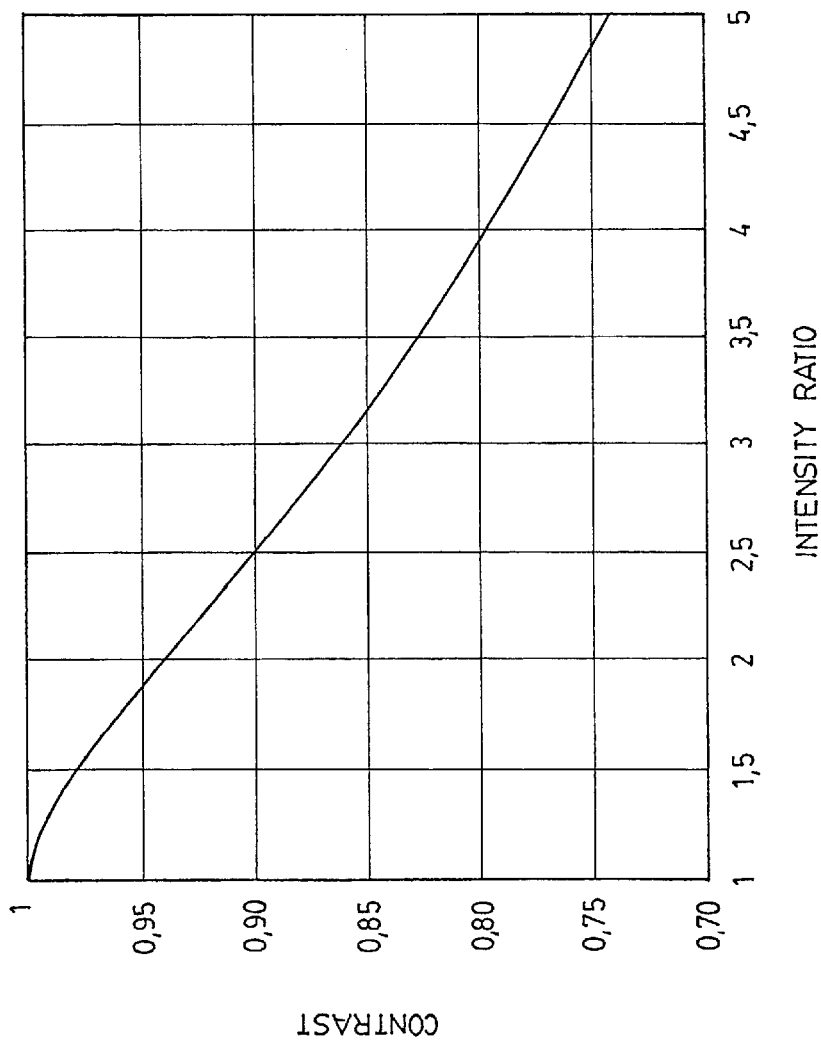
FIG. 5 is a graph showing variations of the contrast of a sinusoidal interference pattern as a function of the ration between both interfering beams.

In order to maintain constant contrast of the interference exposure pattern, the minimum contrast in TE polarisation has to be determined by finding the largest expected difference between individual intensities $I_1(x)$ and $I_2(x)$ on the desired recording length. Equation 5 is then used to evaluate this minimum contrast. Next, the highest contrast is then found the same way, except that we are looking for the smallest difference between individual intensities $I_1(x)$ and $I_2(x)$. At that position (highest contrast), the polarisation is turned in such a way as to lower the contrast to the previously found minimum. It should be noted here that it may not be possible to lower down the contrast as desired since the minimum contrast, for equal individual intensities, is dependent on the incidence angle of both beams. From equations 4 and 5, it is easy to show that small angles of incidence give little contrast control, while higher angles allow the contrast to be greatly reduced (down to zero for 45° incidence). FIG. 4 shows this relationship between contrast, angle of incidence and polarisation angle, while FIG. 5 shows the contrast dependence on intensities ratio for TE polarisation. From FIG. 5, we see that the contrast changes a little even for large ratios of intensities. So for some configurations, the contrast control may not be possible. When possible, it is applicable to any previous cases (A, B and C), in an independent way. Following each measurement of the individual intensities, the proper angle of polarisation is calculated, using equations 4 and 5, and adjusted in order to maintain the previously measured minimum contrast.

Of course, numerous changes could be made to the preferred embodiment disclosed hereinabove without departing from the scope of the invention as defined in the appended claims.

What is claimed is:

1. A device for recording an interference pattern in a photosensitive medium, comprising:

a laser adapted to generate a primary light beam along a path;

expanding means disposed in the path of the primary light beam for spatially expanding said primary light beam, to produce an expanded light beam; and a source opaque screen provided with two openings therein, the two openings being disposed in the path of the expanded light beam, in operation light from the expanded light beam going through the two openings to produce two light beams along different paths;

diffraction gratings respectively disposed in the paths of the two light beams to diffract each of said light beams into a recording beam and a corresponding monitoring beam along different paths, each recording and monitoring beams having a given intensity, the intensity of each recording beam being related to the intensity of the corresponding monitoring beam, the recording beams being incident on a recording location on the photosensitive medium and interfering at said recording location to produce the interference pattern recorded therein; and photo-detectors respectively disposed in the paths of the monitoring beams to detect the intensity thereof and allowing a monitoring of the intensity of the corresponding recording beam.

2. A device according to claim 1, further comprising an electronic shutter disposed in the path of the primary light beam.

3. A device according to claim 1, further comprising a polarisation rotator disposed in the path of the primary light beam.

4. A device according to claim 1, further comprising a light modulator disposed in the path of the primary light beam.

5. A device according to claim 1, wherein the expanding means comprise:

a microscope objective disposed between the laser and the source opaque screen; and a pinhole disposed between the microscope objective and the source opaque screen, proximate to said microscope objective.

6. A device according to claim 1, further comprising a recording opaque screen disposed in the path of both recording beams proximate to the photosensitive medium, the recording opaque screen having an opening therein aligned with the recording location on said photosensitive medium.

7. A device according to claim 6, further comprising translating means for concurrently translating the source opaque screen, the recording opaque screen and the photo-detectors in a direction parallel to the photosensitive medium.

8. A device according to claimed, wherein the translating means comprise a motorized translation stage.

9. A device according to claim 1, wherein the diffraction gratings are integral to each other.

10. A device according to claim 1, wherein each diffraction grating has a grating face and a non-grating face, said non-grating face of each diffraction grating being provided with an anti-reflecting coating.

11. A device according to claim 1, wherein each diffraction grating has a uniform pitch.

12. A device according to claim 1, wherein the diffraction gratings are chirped.

13. A device according to claim 1, wherein the photosensitive medium is chosen from the group consisting of photoresist, dichromated gelatin, silver halide and a photopolymer, said photosensitive medium being deposited on a substrate.

14. A device according to claim 1, wherein the photosensitive medium is a length of optical fiber.

15. A device according to claim 1, further comprising:

an electronic shutter in the path of said primary light beam;

a polarisation rotator, also in the path of the primary light beam;

a light modulator, also in the path of the primary light beam;

a microscope objective and a pinhole disposed in the path of the primary light beam downstream the electric shutter, polarisation rotator and light modulator, defining said expanding means;

a recording opaque screen disposed in the path of both recording beams proximate to the photosensitive medium, the recording opaque screen having an opening therein aligned with the recording location on said photosensitive medium; and translating means for concurrently translating the source opaque screen, the recording opaque screen and the photo-detectors in a direction parallel to the photosensitive medium.

16. A method for recording an interference pattern in a photosensitive medium, comprising the steps of:

(a) producing an expanded light beam and propagating the expanded light beam through a pair of slits provided in a source opaque screen, to produce two light beams along different paths;

(b) propagating said light beams through corresponding diffraction gratings, each of the light beams being diffracted into a monitoring beam and a corresponding recording beam along different paths, each recording and monitoring beams having a given intensity, the intensity of each recording beam being related to the intensity of the corresponding monitoring beam;

(c) impinging the recording beams on a recording location on the photosensitive medium, said recording beams interfering at said recording location to produce the interference pattern which is recorded therein; and (d) detecting the intensity of each monitoring beam to monitor the intensity of the corresponding recording beam.

17. A method according to claim 16, wherein step (c) further comprises a step of limiting a recording location of the photosensitive medium by providing a recording opaque screen in front of the photosensitive medium in proximity thereto, said recording opaque screen having a slit therein in alignment with the paths of both recording beams.

18. A method according to claim 17, wherein, in step (d), the intensity of each monitoring beams is detected by means of photo-detectors.

19. A method according to claim 18, comprising an additional step of (e) concurrently translating at a translation speed the source opaque screen, the recording opaque screen and the photo-detectors in a direction parallel to the photosensitive medium.

20. A method according to claim 19, wherein step (e) further comprises a step of varying the translation speed to control an amplitude of the interference pattern.

21. A method according to claim 20, wherein step (e) further comprises a step of adjusting the varying translation speed by using the intensity of the monitoring beams detected in step (d).

22. A method according to claim 19, wherein step (e) further comprises a step of varying a polarisation of the expanded beam to control an amplitude of the interference pattern.

23. A method according to claim 19, wherein step (e) further comprises a step of moving the slits of the source opaque screen relative to each other concurrently to translating said source opaque screen.

24. A method according to claim 23, wherein, in step (e), the translating of the photo-detectors is done at different translation speeds.

25. A method according to claim 19, wherein step (e) further comprises the steps of:

calculating a recording intensity of the first and second light beams at the recording location, said recording intensity being given by:

$$I(x) = I_1(x) + I_2(x) + 2\sqrt{I_1(x)I_2(x)} \cos(2\pi x[\sin(\theta_1) - \sin(\theta_2)]/\lambda)[\cos^2\beta + \sin^2\beta\cos(\theta_1 - \theta_2)]$$

where x is a position of the recording location, $I_1(x)$ is the intensity of the second diffracted light beam detected in step (d), $I_2(x)$ is the intensity of the fourth diffracted light beam detected in step (d), $\lambda$ is a wavelength of the first and second light beams, $\theta_1$ and $\theta_2$ are respectively angles of incidence of the first and second light beams on the first and diffraction gratings relative to the normal to said gratings, and $\beta$ is a polarisation angle of the first and second beams; and adjusting the varying translation speed in relation to said recording intensity.

26. A device for recording an interference pattern in a photosensitive medium, comprising:

means for producing an expanded light beam;

diffraction means for diffracting light from the expanded light beam;

a source opaque screen provided with two openings limiting light diffracted by the diffraction means to two sets of diffracted beams, each set of diffracted beams including a recording beam converging toward a recording location on the photosensitive medium;

a recording opaque screen provided with an opening situated at the recording location; and translating means for concurrently translating the source opaque screen and the recording opaque screen in a direction parallel to the photosensitive medium.

27. A device according to claim 26, wherein the diffraction means comprise a diffraction grating disposed in a path of the expanded light beam downstream of the source opaque screen.

28. A device according to claim 27, wherein the diffraction grating has a grating face and a non-grating face, said non-grating face being provided with an anti-reflecting coating.

29. A device according to claim 27, wherein the diffraction grating has a uniform pitch.

30. A device according to claim 27, wherein the diffraction grating is chirped.

31. A device according to claim 27, further comprising a photodetector disposed in the path of the expanded light beam upstream of the source opaque screen.

32. A device according to claim 26, wherein the diffraction means comprise a diffraction grating disposed in a path of the expanded light beam upstream of the source opaque screen.

33. A device according to claim 32, wherein the diffraction grating has a grating face and a non-grating face, said non-grating face being provided with an anti-reflecting coating.

34. A device according to claim 32, wherein the diffraction grating has a uniform pitch.

35. A device according to claim 32, wherein the diffraction grating is chirped.

36. A device according to claim 26, wherein the means for producing an expanded light beam comprise:

a laser adapted to generate a primary light beam along a path; and expanding means disposed in the path of the primary light beam for spatially expanding said primary light beam, to produce the expanded light beam.

37. A device according to claim 36, further comprising an electronic shutter disposed in the path of the primary light beam.

38. A device according to claim 36, further comprising a polarisation rotator disposed in the path of the primary light beam.

39. A device according to claim 36, further comprising a light modulator disposed in the path of the primary light beam.

40. A device according to claim 36, wherein the expanding means comprise:

a microscope objective disposed between the laser and the source opaque screen; and a pinhole disposed between the microscope objective and the source opaque screen, proximate to said microscope objective.

41. A device according to claim 26, wherein the means for producing the expanded light beam comprise:

a laser adapted to generate a primary light beam along a path;

an electronic shutter in the path of said primary light beam;

a polarisation rotator, also in the path of the primary light beam;

a light modulator, also in the path of the primary light beam; and a microscope objective and a pinhole disposed in the path of the primary light beam downstream the electric shutter, polarisation rotator and light modulator, for spatially expanding said primary light beam to produce the expanded light beam.

42. A device according to claim 26, wherein the translating means comprise a motorized translation stage.

43. A device according to claim 26, wherein the photosensitive medium is chosen from the group consisting of photoresist, dichromated gelatin, silver halide and a photopolymer, said photosensitive medium being deposited on a substrate.

44. A device according to claim 26, wherein the photosensitive medium is a length of optical fiber.

* * * * *